United States Patent Office.

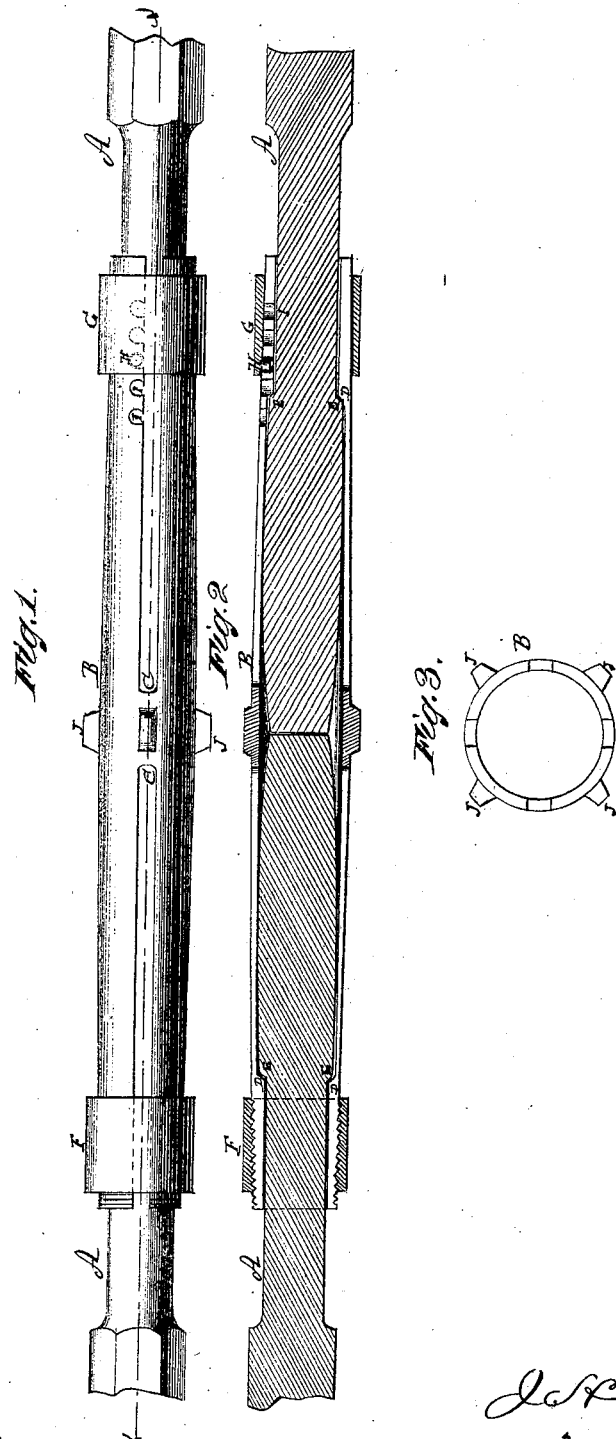

JAMES H. BEATTY, OF FRANKLIN, ASSIGNOR TO JOHN ADAMS AND THADDEUS W. BRIGHAM, OF VENANGO COUNTY, PENNSYLVANIA.

Letters Patent No. 108,959, dated November 8, 1870.

IMPROVEMENT IN SUCKER-ROD COUPLINGS.

The Schedule referred to in these Letters Patent and making part of the same.

*To all whom it may concern:*

Be it known that I, JAMES H. BEATTY, of Franklin, in the county of Venango and State of Pennsylvania, have invented a new and useful Improvement in Sucker-rod Joint-Coupling; and I do hereby declare that the following is a full, clear, and exact description thereof, which will enable others skilled in the art to make and use the same, reference being had to the accompanying drawing forming part of this specification.

This invention relates to a new and useful improvement in a coupling for the joints of sucker or pump-rods, whereby the joint is made durable and effective, is easily applied, and readily detached; and It consists in a slotted sleeve-coupling, with elastic ends, secured on the rod, as hereinafter more fully described.

In the accompanying drawing—

Figure 1 represents a longitudinal view of the coupling attached to the sucker-rod.

Figure 2 is a central longitudinal section of fig. 1, on the line *x x*.

Figure 3 is a cross-section of fig. 1, on the line *y y*, showing only the coupling.

Similar letters of reference indicate corresponding parts.

A represents the sucker-rod.

B is the coupling.

This coupling is formed of a tube, which is slotted from near the center, dividing the ends, from points C, into four (more or less) parts, which, by reason of such separation, are made elastic, so that they may be contracted or brought together by means of a nut or otherwise, and made to embrace the rod, as seen in the drawing.

Near the ends of the coupling, on the inner side, there are shoulders, as seen at D; and on the parts of the rod, as seen at E, there are corresponding shoulders.

When the ends of the coupling are contracted, as seen in the drawing, these shoulders D and E engage with each other, and prevent the parts of the rod from being drawn asunder, while either part of the rod may turn or revolve, if desired.

In this example of my invention, two methods are shown for contracting and holding the ends of the coupling around the parts of the rod.

One is by a screw-nut, F, which engages with a screw-thread on one end of the coupling.

The other method is a sliding band, G, with a lug on its inner side, as seen at H, fig. 2, which engages with a notch in the coupling, as seen at I.

There is a series of these notches or recesses opening into one or more of the slots near the end of the coupling, to allow the band to be properly adjusted.

The notches or recesses I have an opening into the slot, which just admits the lugs, with a lip, which prevents the removal of the lug when it is in the bottom of the notch, except by a slight longitudinal movement.

This formation of the notch aids in keeping the band in place when the rod is in use.

J represents lugs, four (more or less in number) on the outside, at the center of the coupling, which allows, by means of a wrench or otherwise, the coupling to be held, or prevented from turning, when the nut or band is applied.

It will be seen that, by this arrangement, the sucker-rod is inclosed and firmly secured by the coupling.

Having thus described my invention,

I claim as new and desire to secure by Letters Patent—

1. The slotted coupling B, the ends of which are contracted, so as to embrace the rod A, by means of a thimble or nut, and which is provided with the lugs J, substantially in the manner and for the purpose set forth.

2. A sucker-rod coupling, provided with a bayonet-clasp catch upon one end, substantially as shown and described.

JAMES H. BEATTY.

Witnesses:
JAMES WOODBURN,
A. J. VOGUS.